US010268051B2

(12) United States Patent
Etzkorn et al.

(10) Patent No.: US 10,268,051 B2
(45) Date of Patent: *Apr. 23, 2019

(54) EYE-MOUNTABLE DEVICE TO PROVIDE AUTOMATIC ACCOMMODATION AND METHOD OF MAKING SAME

(71) Applicant: Verily Life Sciences LLC, Mountain View, CA (US)

(72) Inventors: James Etzkorn, Mountain View, CA (US); Jeffrey G. Linhardt, Pleasanton, CA (US); Brian Otis, Saratoga, CA (US)

(73) Assignee: Verily Life Sciences LLC, South San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/631,815

(22) Filed: Jun. 23, 2017

(65) Prior Publication Data
US 2017/0293161 A1 Oct. 12, 2017

Related U.S. Application Data

(63) Continuation of application No. 14/710,332, filed on May 12, 2015, now Pat. No. 9,690,118.
(Continued)

(51) Int. Cl.
*G02C 7/04* (2006.01)
*G02C 7/08* (2006.01)
(Continued)

(52) U.S. Cl.
CPC ........ *G02C 7/083* (2013.01); *B29D 11/00817* (2013.01); *G02C 7/022* (2013.01);
(Continued)

(58) Field of Classification Search
CPC .......... G02C 7/022; G02C 7/083; G02C 7/04; G02C 7/085; G02C 2202/16
(Continued)

(56) References Cited

U.S. PATENT DOCUMENTS 7,018,040 B2    3/2006   Blum et al.
7,311,398 B2   12/2007   Kuiper et al.
(Continued)

FOREIGN PATENT DOCUMENTS

EP    2 518 555 A1   10/2012
EP      2620802 A1    7/2013
(Continued)

OTHER PUBLICATIONS

De Smet, J. et al., "Progress toward a liquid crystal contact lens display", Journal of the SID 21/9, DOI: 10.1002/jsid.188, 2014 pp. 399-406.
(Continued)

*Primary Examiner* — Jordan M Schwartz
(74) *Attorney, Agent, or Firm* — Christensen O'Connor Johnson Kindness PLLC

(57) ABSTRACT

An eye-mountable device (EMD) includes a lens enclosure, liquid crystal material, first and second electrodes, a substrate, and a controller. The lens enclosure includes a first encapsulation layer and a second encapsulation layer sealed to the first encapsulation layer. The liquid crystal material is disposed across a central region of the lens enclosure. The first electrode is disposed within the lens enclosure between the first encapsulation layer and the liquid crystal material. The second electrode is disposed within the lens enclosure between the second encapsulation layer and the liquid crystal material. The substrate is disposed within the lens enclosure between the first and second encapsulation layers. The controller is disposed on the substrate and electrically
(Continued)

coupled to the first and second electrodes to apply a voltage across the liquid crystal material.

19 Claims, 7 Drawing Sheets

Related U.S. Application Data

(60) Provisional application No. 62/012,005, filed on Jun. 13, 2014, provisional application No. 62/012,017, filed on Jun. 13, 2014, provisional application No. 62/012,033, filed on Jun. 13, 2014.

(51) Int. Cl.
   *G02C 7/02* (2006.01)
   *B29D 11/00* (2006.01)
   *B29L 11/00* (2006.01)

(52) U.S. Cl.
   CPC ............. *G02C 7/024* (2013.01); *G02C 7/04* (2013.01); *B29L 2011/0041* (2013.01); *G02C 2202/16* (2013.01); *G02C 2202/18* (2013.01)

(58) Field of Classification Search
   USPC .................................................. 351/159.03
   See application file for complete search history.

(56) References Cited

U.S. PATENT DOCUMENTS

| | | | |
|---|---|---|---|
| 8,154,804 B2 | 4/2012 | McGinn et al. | |
| 8,634,145 B2 | 1/2014 | Pugh et al. | |
| 8,636,358 B2 | 1/2014 | Binder | |
| 8,827,446 B2 | 9/2014 | Iyer et al. | |
| 9,155,614 B2 | 10/2015 | Blum et al. | |
| 9,690,118 B2 * | 6/2017 | Etzkorn | G02C 7/04 |
| 2004/0223113 A1 | 11/2004 | Blum et al. | |
| 2005/0073739 A1 | 4/2005 | Meredith et al. | |
| 2007/0153405 A1 | 7/2007 | Kuiper et al. | |
| 2007/0242173 A1 | 10/2007 | Blum et al. | |
| 2008/0208335 A1 | 8/2008 | Blum et al. | |
| 2009/0033863 A1 * | 2/2009 | Blum | A61F 2/14 351/159.34 |
| 2009/0204207 A1 * | 8/2009 | Blum | G02C 7/08 349/13 |
| 2009/0256977 A1 | 10/2009 | Haddock et al. | |
| 2012/0075712 A1 | 3/2012 | Pugh et al. | |
| 2012/0140167 A1 | 6/2012 | Blum | |
| 2012/0236417 A1 | 9/2012 | Pugh et al. | |
| 2012/0245444 A1 | 9/2012 | Otis et al. | |
| 2012/0268712 A1 | 10/2012 | Egan et al. | |
| 2013/0166025 A1 * | 6/2013 | Pugh | G02C 7/04 623/6.22 |
| 2013/0218270 A1 | 8/2013 | Blanckaert et al. | |
| 2013/0245754 A1 | 9/2013 | Blum et al. | |
| 2013/0258275 A1 | 10/2013 | Toner et al. | |
| 2013/0258277 A1 | 10/2013 | Pugh et al. | |
| 2013/0338767 A1 | 12/2013 | Mazzocchi et al. | |
| 2014/0098226 A1 | 4/2014 | Pletcher et al. | |
| 2014/0107447 A1 | 4/2014 | Liu et al. | |
| 2014/0107448 A1 | 4/2014 | Liu et al. | |
| 2014/0192311 A1 | 7/2014 | Pletcher et al. | |
| 2014/0192312 A1 | 7/2014 | Pletcher et al. | |
| 2014/0192313 A1 | 7/2014 | Riall et al. | |
| 2014/0192318 A1 | 7/2014 | Guth et al. | |
| 2014/0194773 A1 | 7/2014 | Pletcher et al. | |
| 2014/0209481 A1 | 7/2014 | Pletcher et al. | |
| 2014/0213867 A1 | 7/2014 | Pletcher et al. | |
| 2014/0240655 A1 | 8/2014 | Pugh et al. | |
| 2014/0243971 A1 | 8/2014 | Pugh et al. | |
| 2014/0276481 A1 | 9/2014 | Pugh et al. | |
| 2014/0327875 A1 | 11/2014 | Blum et al. | |
| 2015/0081016 A1 * | 3/2015 | De Sio | G02C 7/04 623/6.22 |
| 2016/0170097 A1 * | 6/2016 | Milton | B29D 11/00038 349/13 |

FOREIGN PATENT DOCUMENTS

| | | |
|---|---|---|
| JP | 2005-505789 A | 2/2005 |
| WO | 2004015460 A2 | 2/2004 |
| WO | 2008091859 A1 | 7/2008 |
| WO | WO 2009/048647 A1 | 4/2009 |
| WO | 2010033679 A2 | 3/2010 |
| WO | WO 2013/086078 A1 | 6/2013 |
| WO | WO 2015/015205 A1 | 2/2015 |

OTHER PUBLICATIONS

De Smet, J. et al., "A Liquid Crystal Based Contact Lens Display Using PEDOT: PSS and Obliquely Evaporated SiO2", Late-News Poster, SID 2012 Digest, pp. 1375-1378.

Milton, H. et al., "Optimization of refractive liquid crystal lenses using an efficient multigrid simulation", May 2012, vol. 20, No. 10, Optics Express, pp. 11159-11165.

Milton, H. et al., "Switchable liquid crystal contact lenses: dynamic vision for the ageing eye", Proc. of SPIE vol. 9004 90040H, 6 pages. Downloaded From: http://spiedigitallibrary.org/ on Mar. 28, 2014.

Milton, H. et al., "Electronic liquid crystal contact lenses for the correction of presbyopia", Apr. 2014, vol. 22, No. 7, DOI:10.1364/OE.22.008035, Optics Express, pp. 8035-8040.

Tremblay, E. et al. "Switchable telescopic contact lens", Jul. 2013, vol. 21, No. 13, DOI:10.1364/OE.21.015980, Optics Express, pp. 15980-15986.

Yeager, Daniel J. et al., "A Contact Lens With Capacitive Gaze Tracking", U.S. Appl. No. 14/587,664, filed Dec. 31, 2014, 41 pages.

PCT/US2015/031415—International Search Report and Written Opinion, dated Aug. 28, 2015, 24 pages.

Extended European Search Report for EP Patent Application No. 15807226.4, dated Dec. 6, 2017, 8 pages.

Notice of Reasons for Rejection for Japanese Patent Application No. 2016-567497, dated Nov. 28, 2017, 11 pages.

Examination Report for Canadian Patent Application 2,950,560, dated Aug. 16, 2017, 3 pages.

Examination Report No. 1 issued in the corresponding Australian Patent Application No. AU 2015275156 dated Sep. 11, 2017, 3 pages.

Examiner's Report for Canadian Patent Application No. 2,950,560 dated Jun. 19, 2018, 3 pages.

First Office Action for Chinese Patent Application No. 201580031769.2 dated Aug. 2, 2018, 29 pages.

First Examination Report for EP Patent Application No. 15807226.4 dated Nov. 13, 2018, 5 pages.

Examination Report No. 1 for Australian Patent Application No. 2018202379 dated Nov. 21, 2018, 3 pages.

* cited by examiner

EYE-MOUNTABLE DEVICE TO PROVIDE AUTOMATIC ACCOMMODATION AND METHOD OF MAKING SAME

CROSS REFERENCE TO RELATED APPLICATIONS

The present patent application is a continuation of U.S. application Ser. No. 14/710,332 filed on May 12, 2015, which claims priority under the provisions of 35 U.S.C. § 119(e) to U.S. Provisional Application No. 62/012,005 filed Jun. 13, 2014, to U.S. Provisional Application No. 62/012,017 filed Jun. 13, 2014, and to U.S. Provisional Application No. 62/012,033 filed Jun. 13, 2014, all of which contents are hereby incorporated by reference.

BACKGROUND

1. Technical Field

This disclosure relates generally to the field of optics, and in particular but not exclusively, relates to contact lenses.

2. Background Art

Accommodation is a process by which the eye adjusts its focal distance to maintain focus on objects of varying distance. Accommodation is a reflex action, but can be consciously manipulated. Accommodation is controlled by contractions of the ciliary muscle. The ciliary muscle encircles the eye's elastic lens and applies a force on the elastic lens during muscle contractions that change the focal point of the elastic lens.

As an individual ages, the effectiveness of the ciliary muscle degrades. Presbyopia is a progressive age-related loss of accommodative or focusing strength of the eye, which results in increased blur at near distances. This loss of accommodative strength with age has been well studied and is relatively consistent and predictable. Presbyopia affects nearly 1.7 billion people worldwide today (110 million in the United States alone) and that number is expected to substantially rise as the world's population ages. Techniques and devices that can help individuals offset the effects of Presbyopia are increasingly in demand.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Figure 1:
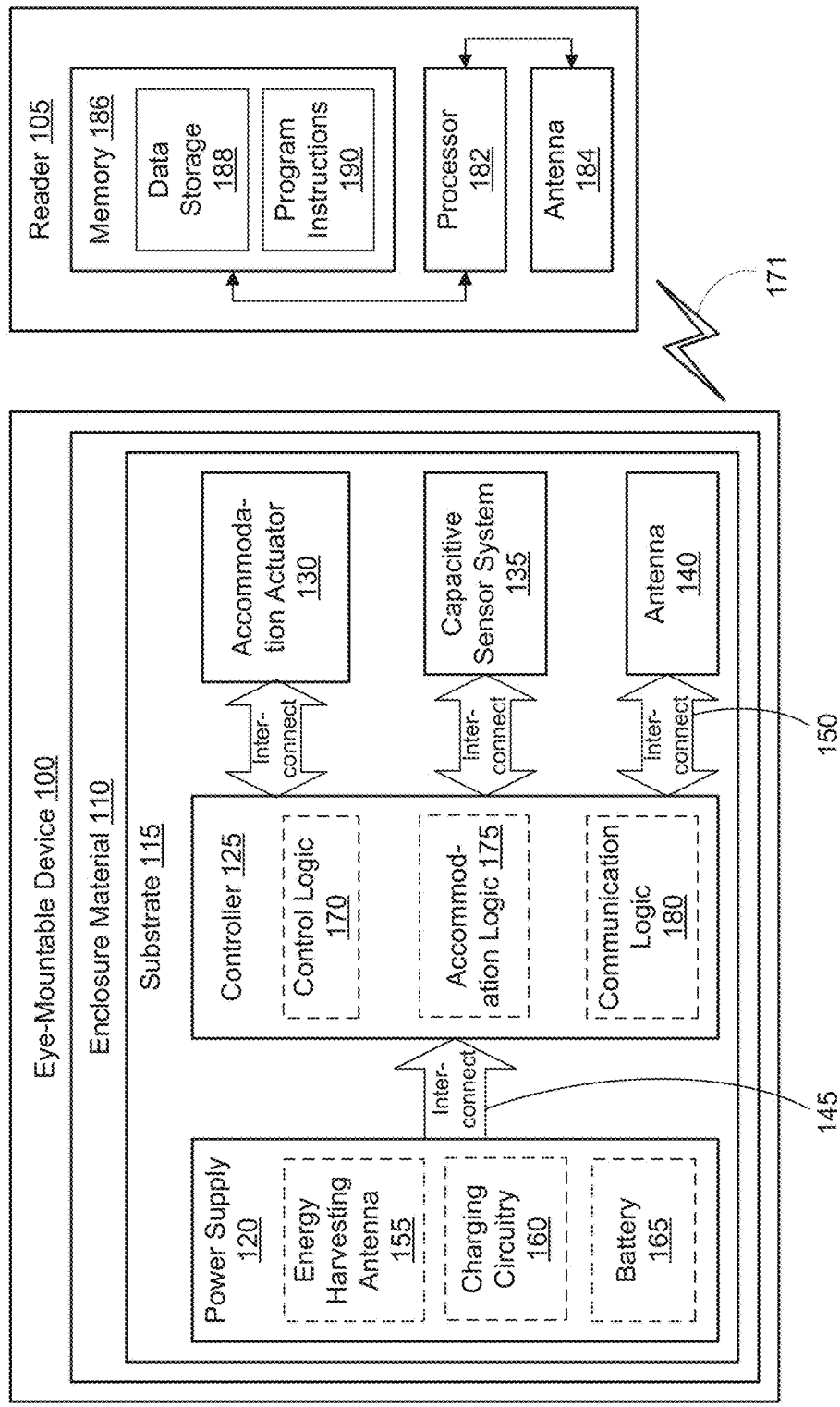
FIG. 1 is a functional block diagram of an eye-mountable device that provides auto-accommodation and an external reader for interacting with the eye-mountable device, in accordance with an embodiment.

Embodiments of a system, apparatus, and method of fabrication for an eye-mountable device (or "EMD") including an accommodation actuator are described herein. In the following description numerous specific details are set forth to provide a thorough understanding of the embodiments. One skilled in the relevant art will recognize, however, that the techniques described herein may be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Described herein is a smart contact lens or other eye-mountable device that comprises an electrically activated lens including an accommodation actuator for adjusting the focal distance of the contact lens. In some embodiments, the accommodation is automatically adjusted in real-time based upon a user's gazing direction. The accommodation actuator is disposed in a center region of the smart contact lens (e.g., covering at least the foveal vision). As such, it is desirable that structures and/or fabrication processes aid in the positioning of an accommodation actuator—e.g., relative to electrodes and/or other circuitry that is to support operation of the accommodation actuator.

The accommodation actuator may be implemented with a layer of liquid crystal (LC) material, and may require electrodes to electronically control the accommodation actuator. Accordingly, electrical, structural and/or other isolation may need to be provided—e.g., between the electrodes or between the liquid crystal and control circuitry of the EMD. Embodiments of the instant disclosure mitigate drawbacks that, for example, are associated with fabrication of an accommodation actuator separately from other lens structures. Certain embodiments variously allow for an accommodation actuator (e.g., including a LC material and adjoining layers or polyimide or other alignment material) to be built up, by successive processing steps, on an enclosure layer that, for example, is to form at least part of an exterior of a lens enclosure. Such an enclosure layer may be subsequently sealed to another enclosure layer to form the lens enclosure, where the accommodation actuator is surrounded by, and sealed with, a pinch-off region of the lens enclosure.

Embodiments of the eye-mountable device may include a power supply, control electronics, an accommodation actuator, a gaze direction sensor system, and an antenna all embedded within a lens enclosure formed to be contact mounted to an eye (e.g., shaped to be removeably mounted to a cornea and allow eyelid motion to open and close). In one embodiment, the control electronics are coupled to monitor the sensor system to identify gaze direction/focal distance, manipulate the accommodation actuator to control the optical power of the eye-mountable device, and provide wireless communications with an external reader. In some embodiments, the power supply may include charging circuitry for controlling inductive wireless charging of an embedded battery.

The lens enclosure may be fabricated of a variety of materials compatible for direct contact with a human eye, such as a polymeric material, a hydrogel, PMMA, silicone based polymers (e.g., fluoro-silicon acrylate), or otherwise. The electronics may be disposed upon a substrate—e.g., having a ring shape—embedded within the lens enclosure near its periphery to avoid interference with incident light received closer to the central region of the cornea. The sensor system may be arranged on the substrate to face outward towards the eyelids to detect the gaze direction/focal distance based upon the amount and position of eyelid coverage over the sensor system. As the eyelids cover different portions of the sensor system, this changes a characteristic (e.g., its capacitance), which may be measured to determine gaze direction and/or focal distance.

In some embodiments, the gaze direction/focal distance information may then be used to determine the amount of accommodation to be applied via a see-through accommodation actuator positioned in a central portion of the lens enclosure. The accommodation actuator is coupled to the controller to be electrically manipulated thereby via the application of a voltage across a pair of electrodes. For example, the accommodation actuator maybe implemented with a LC cell that changes its index of refraction in response to an applied electrical bias signal across the electrodes. In other embodiments, the accommodation actuator may be implemented using other types of electro-active materials such as electro-optic materials that vary refractive index in the presence of an applied electric field or electro-mechanical structures that change the shape of a deformable lens. Other example structures that may be used to implement the accommodation actuator include electro-wetting optics, micro-electro-mechanical systems, or otherwise.

Features of various embodiments are described herein in the context of a flexible eye-mountable accommodating lens device including an accommodation actuator comprising a LC layer, wherein an optical strength (e.g., corresponding to a particular focal length) of the device may be changed based on capacitive gaze tracking mechanisms. However, such description may be extended to additionally or alternatively apply to any of a variety of other accommodating optical devices that may operate in or on an eye of a user. For example, certain embodiments are not limited with respect to a particular flexibility/rigidity of the eye-mountable device and/or a particular mechanism (e.g., LC element or other) by which an accommodation actuator changes an optical strength of the device. Furthermore, some embodiments are not limited with respect to a capacitive gaze tracking, photodetector gaze tracking of other technique that may be used to determine whether a change in optical strength is to take place.

FIG. 1 is a functional block diagram of an eye-mountable device (EMD) 100 with gaze tracking for auto-accommodation along with an external reader 105, in accordance with an embodiment of the disclosure. The exposed portion of EMD 100 is a flexible lens enclosure 110 formed to be contact-mounted to a corneal surface of an eye. A substrate 115 is embedded within or surrounded by flexible lens enclosure 110 to provide a mounting surface for a power supply 120, a controller 125, a sensor system 135, an antenna 140, and various interconnects 145 and 150. An accommodation actuator 130 is embedded within flexible lens enclosure 110 and coupled to controller 125 to provide auto-accommodation to the wearer of EMD 100. The illustrated embodiment of power supply 120 includes an energy harvesting antenna 155, charging circuitry 160, and a battery 165. The illustrated embodiment of controller 125 includes control logic 170, accommodation logic 175, and communication logic 180. The illustrated embodiment of reader 105 includes a processor 182, an antenna 184, and memory 186.

Controller 125 is coupled to receive feedback control signals from sensor system 135 and further coupled to operate accommodation actuator 130. Power supply 120 supplies operating voltages to the controller 125 and/or the accommodation actuator 130. Antenna 140 is operated by the controller 125 to communicate information to and/or from EMD 100. In one embodiment, antenna 140, controller 125, power supply 120, and sensor system 135 are all situated on the embedded substrate 115. In one embodiment, accommodation actuator 130 is embedded within a center region of flexible lens enclosure 110, but is not disposed on substrate 115. Because EMD 100 includes electronics and is configured to be contact-mounted to an eye, it is also referred to herein as an ophthalmic electronics platform, a contact lens, or a smart contact lens.

To facilitate contact-mounting, the flexible lens enclosure 110 may have a concave surface configured to adhere ("mount") to a moistened corneal surface (e.g., by capillary forces with a tear film coating the corneal surface). Additionally or alternatively, the EMD 100 may be adhered by a vacuum force between the corneal surface and flexible lens enclosure 110 due to the concave curvature. While mounted with the concave surface against the eye, the outward-facing surface of flexible lens enclosure 110 may have a convex curvature that is formed to not interfere with eye-lid motion while the EMD 100 is mounted to the eye. For example, flexible lens enclosure 110 may be a substantially transparent curved disk shaped similarly to a contact lens.

Flexible lens enclosure 110 may include one or more biocompatible materials, such as those employed for use in contact lenses or other ophthalmic applications involving direct contact with the corneal surface. Flexible lens enclosure 110 may optionally be formed in part from such biocompatible materials or may include an outer coating with such biocompatible materials. Flexible lens enclosure 110 may include materials configured to moisturize the corneal surface, such as hydrogels and the like. Flexible lens enclosure 110 is a deformable ("non-rigid") material to enhance wearer comfort. In some instances, flexible lens enclosure 110 may be shaped to provide a predetermined, vision-correcting optical power, such as can be provided by a contact lens. Flexible lens enclosure 110 may be fabricated of various materials including a polymeric material, a hydrogel, PMMA, silicone based polymers (e.g., fluoro-silicon acrylate), or otherwise.

Substrate 115 includes one or more surfaces suitable for mounting sensor system 135, controller 125, power supply 120, and antenna 140. Substrate 115 may be employed both as a mounting platform for chip-based circuitry (e.g., by flip-chip mounting) and/or as a platform for patterning conductive materials (e.g., gold, platinum, palladium, titanium, copper, aluminum, silver, metals, other conductive materials, combinations of these, etc.) to create electrodes, interconnects, antennae, etc. In some embodiments, substantially transparent conductive materials (e.g., indium tin oxide or the flexible conductive materials discussed below) may be patterned on substrate 115 to form circuitry, electrodes, etc. For example, antenna 140 may be formed by depositing a pattern of gold or another conductive material on substrate 115. Similarly, interconnects 145 and 150 may be formed by depositing suitable patterns of conductive materials on substrate 115. A combination of resists, masks, and deposition techniques may be employed to pattern materials on substrate 115. Substrate 115 may be a relatively rigid material, such as polyethylene terephthalate ("PET") or another material sufficient to structurally support the circuitry and/or electronics within enclosure material 110. EMD 100 may alternatively be arranged with a group of unconnected substrates rather than a single substrate. For example, controller 125 and power supply 120 may be mounted to one substrate, while antenna 140 and sensor system 135 are mounted to another substrate and the two may be electrically connected via interconnects.

Although certain embodiments are not limited in this regard, substrate 115 may be shaped as a flattened ring with a radial width dimension sufficient to provide a mounting platform for the embedded electronics components. Substrate 115 may have a thickness sufficiently small to allow the substrate to be embedded in flexible lens enclosure 110 without adversely influencing the profile of EMD 100. Substrate 115 may have a thickness sufficiently large to provide structural stability suitable for supporting the electronics mounted thereon. For example, substrate 115 may be shaped as a ring with a diameter of about 10 millimeters, a radial width of about 1 millimeter (e.g., an outer radius 1 millimeter larger than an inner radius), and a thickness of about 50 micrometers. Substrate 115 may optionally be aligned with the curvature of the eye-mounting surface of EMD 100 (e.g., convex surface). For example, substrate 115 may be shaped along the surface of an imaginary cone between two circular segments that define an inner radius and an outer radius. In such an example, the surface of substrate 115 along the surface of the imaginary cone defines an inclined surface that is approximately aligned with the curvature of the eye mounting surface at that radius.

In some embodiments, power supply 120 and controller 125 (and the substrate 115) may be positioned away from the center of EMD 100 and thereby avoid interference with light transmission to the eye through the center of EMD 110. In contrast, accommodation actuator 130 may be centrally positioned to apply optical accommodation to the light transmitted to the eye through the center of enclosure material 110. For example, where EMD 100 is shaped as a concave-curved disk, substrate 115 may be embedded around the periphery (e.g., near the outer circumference) of the disk. In some embodiments, sensor system 135 includes one or more discrete capacitance sensors that are peripherally distributed to sense the eyelid overlap.

In the illustrated embodiment, power supply 120 includes a battery 165 to power the various embedded electronics, including controller 125. Battery 165 may be inductively charged by charging circuitry 160 and energy harvesting antenna 155. In one embodiment, antenna 140 and energy harvesting antenna 155 are independent antennae, which serve their respective functions of energy harvesting and communications. In another embodiment, energy harvesting antenna 155 and antenna 140 are the same physical antenna that are time shared for their respective functions of inductive charging and wireless communications with reader 105. Charging circuitry 160 may include a rectifier/regulator to condition the captured energy for charging battery 165 or directly power controller 125 without battery 165. Charging circuitry 160 may also include one or more energy storage devices to mitigate high frequency variations in energy harvesting antenna 155. For example, one or more energy storage devices (e.g., a capacitor, an inductor, etc.) may be connected to function as a low-pass filter.

Controller 125 contains logic to choreograph the operation of the other embedded components. Control logic 170 controls the general operation of EMD 100, including providing a logical user interface, power control functionality, etc. Accommodation logic 175 includes logic for monitoring feedback signals from sensor system 135, determining the current gaze direction or focal distance of the user, and manipulating accommodation actuator 130 in response to provide the appropriate accommodation. The auto-accommodation may be implemented in real-time based upon feedback from the gaze tracking, or permit user control to select specific accommodation regimes (e.g., near-field accommodation for reading, far-field accommodation for regular activities, etc.). Communication logic 180 provides communication protocols for wireless communication with reader 105 via antenna 140. In one embodiment, communication logic 180 provides backscatter communication via antenna 140 when in the presence of an electromagnetic field 171 output from reader 105. In one embodiment, communication logic 180 operates as a smart wireless radio-frequency identification ("RFID") tag that modulates the impedance of antenna 140 for backscatter wireless communications. The various logic modules of controller 125 may be implemented in software/firmware executed on a general purpose microprocessor, in hardware (e.g., application specific integrated circuit), or a combination of both.

EMD 100 may include various other embedded electronics and logic modules. For example, a light source or pixel array may be included to provide visible feedback to the user. An accelerometer or gyroscope may be included to provide positional, rotational, directional or acceleration feedback information to controller 125.

Figure 2A:
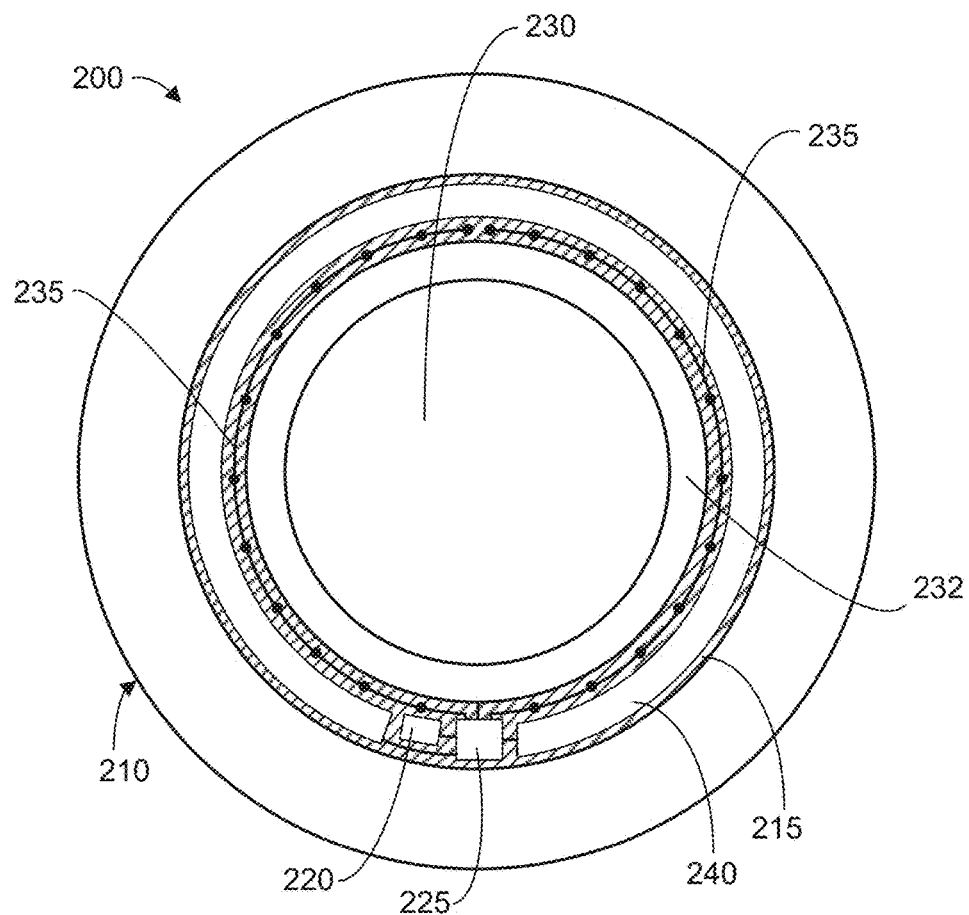
FIG. 2A is a top view illustration of an eye-mountable device, in accordance with an embodiment.
Figure 2B:
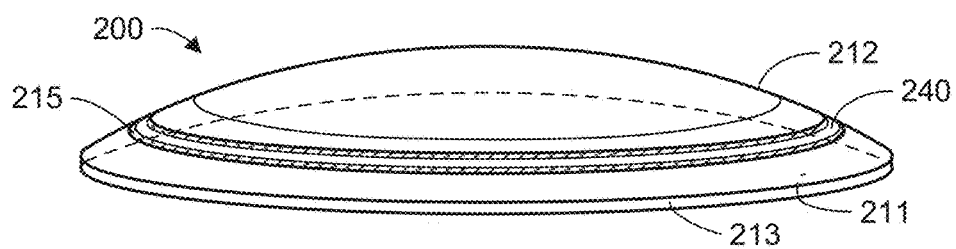
FIG. 2B is a perspective view illustration of an eye-mountable device, in accordance with an embodiment.

FIGS. 2A and 2B illustrate two views of an EMD 200, in accordance with an embodiment of the disclosure. FIG. 2A is a top view of EMD 200 while FIG. 2B is a perspective view of the same. EMD 200 is one possible implementation of EMD 100 illustrated in FIG. 1. The illustrated embodiment of EMD 200 includes a flexible lens enclosure 210, a ring substrate 215, a power supply 220, a controller 225, an accommodation actuator 230, a capacitive sensor system 235, and an antenna 240. It should be appreciated that FIGS. 2A and 2B are not necessarily drawn to scale, but have been illustrated for purposes of explanation only in describing the arrangement of the example EMD 200.

Flexible lens enclosure 210 of EMD 200 is shaped as a curved disk. Flexible lens enclosure 210 is formed with one side having a concave surface 211 suitable to fit over a corneal surface of an eye. The opposite side of the disk has a convex surface 212 that does not interfere with eyelid motion while EMD 200 is mounted to the eye. In the illustrated embodiment, a circular or oval outer side edge 213 connects the concave surface 211 and convex surface 212.

EMD 200 may have dimensions similar to a vision correction and/or cosmetic contact lenses, such as a diameter of approximately 1 centimeter, and a thickness of about 0.1 to about 0.5 millimeters. However, the diameter and thickness values are provided for explanatory purposes only. In some embodiments, the dimensions of EMD 200 are selected according to the size and/or shape of the corneal surface of the wearer's eye. Flexible lens enclosure 210 may be formed with a curved shape in a variety of ways. For example, techniques similar to those employed to form vision-correction contact lenses, such as heat molding, injection molding, spin casting, etc. may be employed to form flexible lens enclosure 210.

Ring substrate 215 is embedded within flexible lens enclosure 210. Ring substrate 215 may be embedded to be situated along the outer periphery of flexible lens enclosure 210, away from the central region where accommodation actuator 230 is positioned. In the illustrated embodiment, ring substrate 215 encircles accommodation actuator 230. Ring substrate 215 does not interfere with vision because it is too close to the eye to be in focus and is positioned away from the central region where incident light is transmitted to the light-sensing portions of the eye. In some embodiments, ring substrate 215 may optionally be formed of a transparent material to further mitigate effects on visual perception. Ring substrate 215 may be shaped as a flat, circular ring (e.g., a disk with a centered hole). The flat surface of ring substrate 215 (e.g., along the radial width) is a platform for mounting electronics and for patterning conductive materials to form electrodes, antenna(e), and/or interconnections.

Capacitive sensor system 235 is distributed about EMD 200 to sense eyelid overlap in a manner similar to capacitive touch screens. By monitoring the amount and position of eyelid overlap, feedback signals from capacitive sensor system 235 may be measured by controller 225 to determine the approximate gaze direction and/or focal distance. In the illustrated embodiment, capacitive sensor system 235 is formed by a series of parallel coupled discrete capacitive elements. Other implementations may be used.

Accommodation actuator 230 is centrally positioned within flexible lens enclosure 210 to affect the optical power of EMD 200 in the user's center of vision. A pinch-off region 232 may be disposed between accommodation actuator 230 and ring substrate 215 to provide electrical isolation from at least some circuitry of ring substrate 215. In various embodiments, accommodation actuator 230 includes an element that changes its index of refraction under the influence of flexible conductive electrodes manipulated by controller 225. By changing its refractive index, the net optical power of the curved surfaces of EMD 200 is altered, thereby applying controllable accommodation. Accommodation actuator 230 may be implemented using a variety of different optoelectronic elements. For example, accommodation actuator 230 may be implemented using a layer of liquid crystal (e.g., a LC cell) disposed in the center of flexible lens enclosure 210. In other embodiments, accommodation actuator 230 may be implemented using other types of electro-active optical materials such as electro-optic materials that vary refractive index in the presence of an applied electric field. Accommodation actuator 230 may be a distinct device embedded within enclosure material 210 (e.g., LC cell), or a bulk material having a controllable refractive index. In yet another embodiment, accommodation actuator 230 may be implemented using a deformable lens structure that changes shape under the influence of an electrical signal. Accordingly, the optical power of EMD 200 is controlled by controller 225 with the application of electric signals via one or more electrodes extending from controller 225 to accommodation actuator 230.

Figure 3:
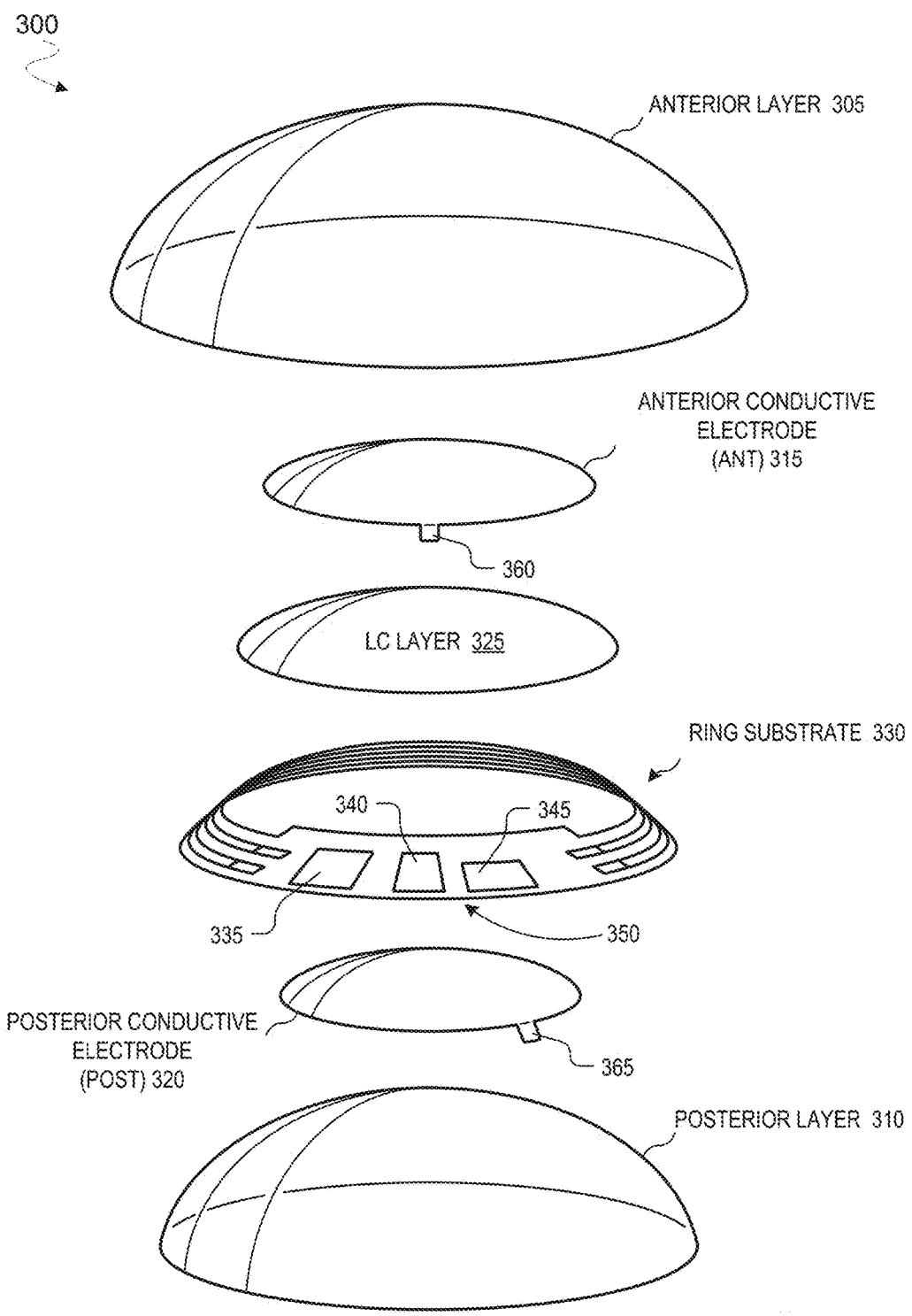
FIG. 3 is an exploded perspective view that illustrates the various components and layers of an eye-mountable device, in accordance with an embodiment.

FIG. 3 is an explode perspective view illustrating an EMD 300, in accordance with an embodiment of the disclosure. EMD 300 is one possible implementation of EMDs 100 or 200, but the exploded perspective illustration shows additional details of various components. The illustrated embodiment of EMD 300 includes a flexible lens enclosure including an anterior layer 305 and a posterior layer 310, an anterior flexible conductive electrode (ANT) 315, a posterior flexible conductive electrode (POST) 320, a liquid crystal layer 325, a ring substrate 330, a power supply 335, a controller circuit 340, an anterior contact pad 345, and a posterior contact pad 350 (hidden in FIG. 3). Collectively, the ANT 315, LC layer 325, and POST 320 form an accommodation actuator that is manipulated under the influence of controller circuit 340. The illustrated embodiment of ANT 315 includes a connection tab 360 and the illustrated embodiment of POST 320 includes a connection tab 365.

ANT 315 and POST 320 are transparent electrodes that electrically manipulate LC layer 325 via the application of a voltage across the electrodes. ANT 315 and POST 320 are flexible conductors that substantially maintain their conductivity even in the presence of cyclical mechanical stressing including folding and bending. ANT 315 and POST 320 are formed from a liquid conductor material that is cured onto, and therefore conform to, the curved surfaces of anterior layer 305 and posterior layer 310, respectively. ANT 315 and POST 320 may be applied to anterior layer 305 and posterior layer 310, respectively, using a variety of techniques. For example, a liquid conductor material including conductive epoxy, conductive polymer, conductive silicon, evaporated metal or other conductive material may be spray coated, stamped, shadow masked or otherwise disposed to form electrode structures to operate an accommodation actuator. In one embodiment, the liquid conductor material is spray coated on the inside concave surface of anterior layer 305 using a conforming concave stencil and is also spray coated on the inside convex surface of posterior layer 310 using a conforming convex stencil. In other embodiments, the spray coating may be actively controlled without use of stencils, or applied after application of a temporary mask. In yet other embodiments, the liquid conductor material is coated onto a stamp with a conforming shaped surface that is then pressed to anterior layer 305 or posterior layer 310 to transfer the liquid conductor material. Other application techniques may also be used to form and position ANT 315 and POST 320 onto anterior layer 305 and posterior layer 310, respectively. In one embodiment, ANT 315 and POST 320 are formed to achieve a desired total sheet resistance. Target sheet resistances may range between 100 ohms/square to 2000 ohms/square (e.g., 190 ohms/square). Of course, other target sheet resistances outside this range may also be used.

LC layer 325 may be disposed between anterior layer 305 and posterior layer 310 in a central region of the EMD 300. Formation of LC layer 325 may include spraying, spinning, masking, stamping, stenciling, and/or other operations adapted from conventional fabrication techniques. LC layer 325 may comprise, for example, poly(3,4-ethylenedioxythiophene):poly(styrenesulfonate) (or PEDOT:PSS) or any of various other liquid crystals that provide for variable refractive index characteristics. In an embodiment, LC layer 325 is isolated electrically from at least some circuitry of ring substrate 325. Additionally or alternatively, LC layer 325 may be disposed between ANT 315 and POST 320 in the central region of EMD 300.

Figure 4:
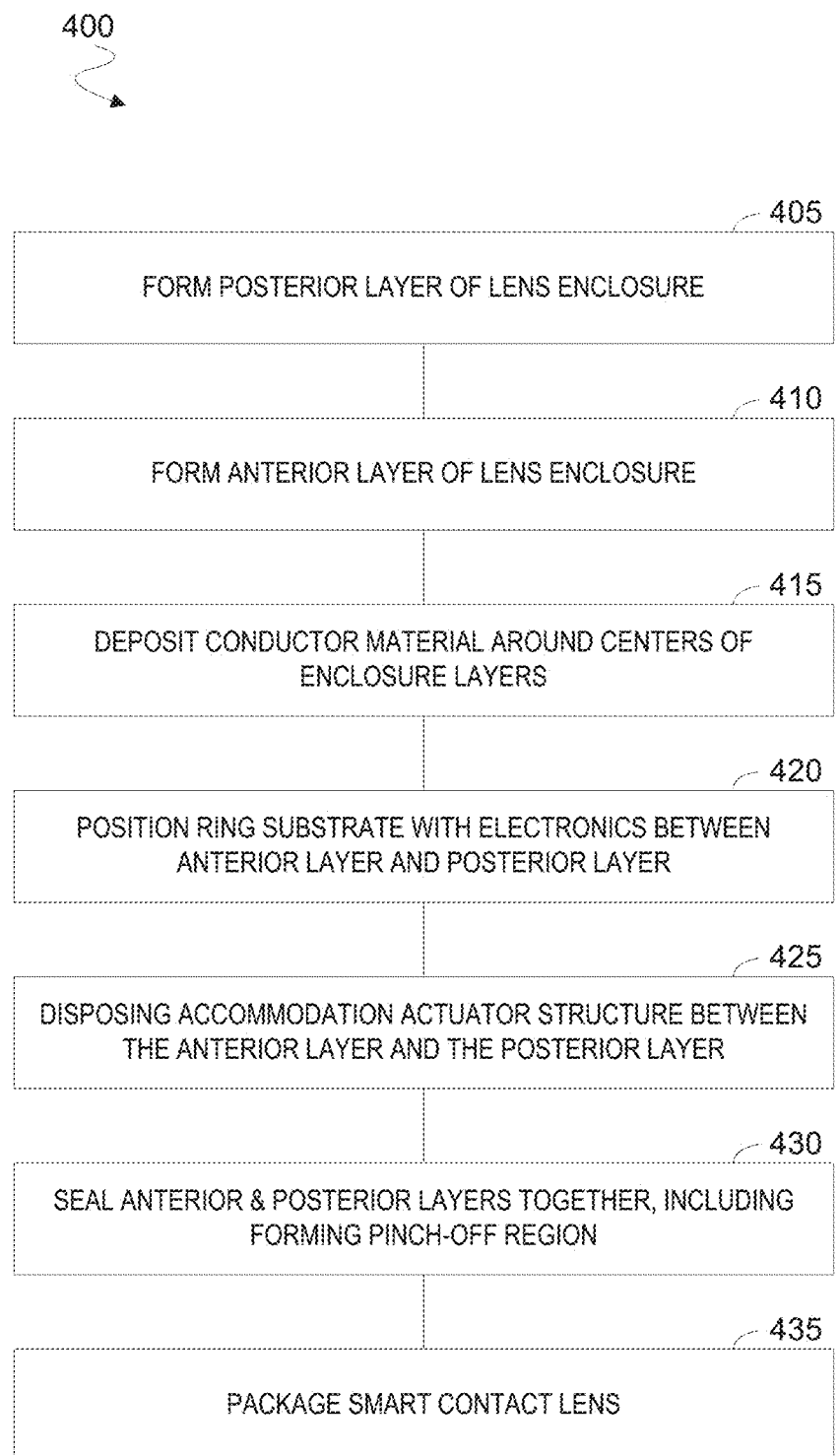
FIG. 4 is a flow chart illustrating a process for fabricating an eye-mountable device with a liquid crystal accommodation actuator, in accordance with an embodiment.

FIG. 4 is a flow chart illustrating a process 400 for fabricating an EMD—e.g., one of eye-mountable devices 100, 200, or 300—in accordance with an embodiment of the disclosure. The order in which some or all of the process blocks appear in process 400 should not be deemed limiting. Rather, one of ordinary skill in the art having the benefit of the present disclosure will understand that some of the process blocks may be executed in a variety of orders not illustrated, or even in parallel. Features of process 400 are described herein with reference to fabrication of EMD 300. However, such description may be extended to additionally or alternatively apply to fabrication of any of various other EMDs having features set forth herein.

In process blocks 405 and 410, anterior layer 305 and posterior layer 310 are formed as separate layers of a lens enclosure. Anterior layer 305 and posterior layer 310 may be formed using molds that are spray coated or injected with a flexible, transparent material. The flexible, transparent material may include any of a polymeric material, a hydrogel, PMMA, silicone based polymers (e.g., fluoro-silicon acrylate), or otherwise.

Although certain embodiments are not limited in this regard, anterior layer 305 and/or posterior layer 310 may be treated to form reactive surfaces for improved bonding to the ANT 315 and POST 320. For example, anterior layer 305 and posterior layer 310 may be plasma treated in a highly ionizing environment that causes the inside surfaces of anterior layer 305 and posterior layer 310 to be chemically reactive.

In a process block 415, conductor material that forms ANT 315 and POST 320 is deposited onto the concave surface of anterior layer 305 and deposited onto the convex surface of posterior layer 310. In one embodiment, the deposition of the liquid conductor material may be spray coated over stencils that conform to the concave and convex surfaces. In yet another embodiment, the liquid conductive material is applied to stamps with curved surfaces that conform to the concave and convex surfaces of anterior layer 305 and posterior layer 310, respectively. The coated stamps are then pressed against the inside surfaces of anterior layer 305 and posterior layer 310 to transfer the ink pattern thereto. After application of the liquid conductor material, it may be cured and/or annealed—e.g., with heat.

The conductor material may include a conductive epoxy (e.g., any of various conductive silicones), evaporated metal (gold, aluminum), a colloidal solution of conductive particles (e.g., nanotubes or nanowires) and/or the like. Deposition of the conductor material may include forming any of a variety of conductive structures including, but not limited to, one or more gold wires, silver nanowires, an indium tin oxide thin film, etc. In some embodiments, various solvents (e.g., alcohol), surfactants, or dilutants may be added to the liquid conductor material to improve the uniform coating and adhesion of ANT 315 and POST 320 to anterior layer 305 and posterior layer 310, respectively.

Next, ring substrate 330, including power supply 335 and controller circuit 340, are positioned between the anterior layer 305 and the posterior layer 310—e.g., including positioning the substrate over the convex surface of posterior layer 310 (process block 420). Before or during the positioning at 420, a conductive adhesive may be applied to contact pads on ring substrate 330 in preparation for electrical coupling of ring substrate 330 to one or both of ANT 315 and POST 320. The positioning at 420 may include aligning connection tabs 360, 365 each with a respective contact pad of ring substrate 330—e.g., where connection tabs 360, 365 are radially offset from one another.

In a process block 425, an accommodation actuator structure is disposed between the anterior layer and the posterior layer. For example, a liquid crystal material may be dispensed around (e.g., including dispensing on) the center region of the concave surface of anterior layer 305 and covers over ANT 315. In one embodiment, the LC material is dispensed over a larger area such that LC layer 325 covers a greater area than either ANT 315 or POST 320.

In a process block 430, the two halves (anterior layer 305 and posterior layer 310) of the lens enclosure are pressed together and sealed. For example, an amount of enclosure material may be added between anterior layer 305 and posterior layer 310 in a region around a circumference of the LC material. Curing of this material between the anterior and posterior layers may result in a pinch-off region being formed around the LC material. In one embodiment, more enclosure material is also added to the bottom edge or rim of the mated anterior layer 305 and posterior layer 310 to form the seal. Curing of this additional enclosure material may seal the substrate in a peripheral region between anterior layer 305 and posterior layer 310. Finally, the eye-mountable device or smart contact lens is packaged into a sealed container of lens solution for distribution (process block 435).

It will be appreciated that the particular order of the operations shown for method 400 is not limiting on some embodiments. By way of illustration and not limitation, some or all portions of an accommodation actuator, electrode structures and/or a ring substrate may be variously fabricated and combined with one another, according to different embodiments, as a separate component prior to assembly of such a component with one or both lens enclosure layers.

Figure 5:
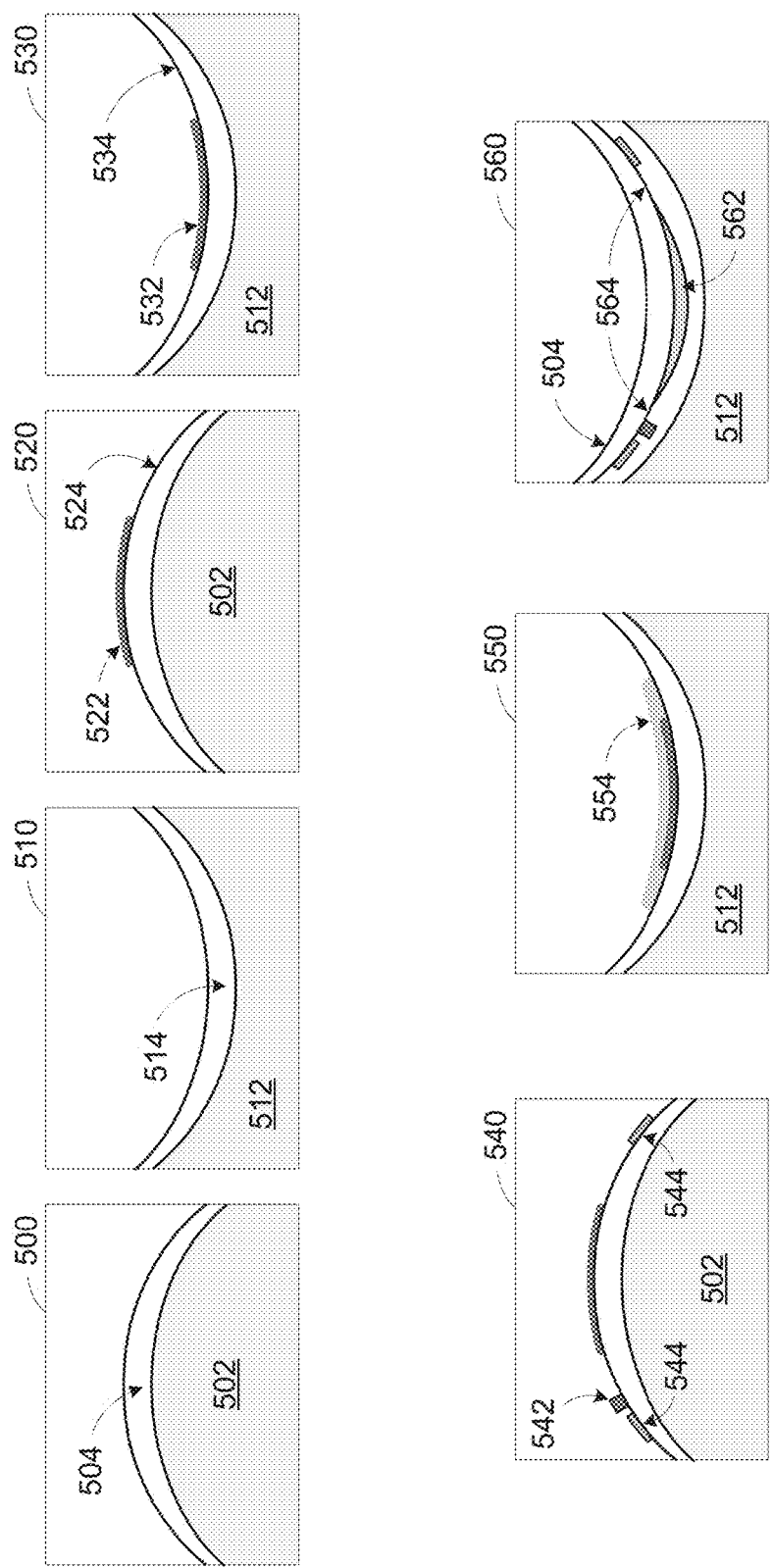
FIG. 5 shows cross-sectional views of a process to fabricate an eye-mountable device according to an embodiment.

FIG. 5 illustrates cross-sectional detail views of processing to fabricate an eye-mountable device according to an embodiment. Fabrication processes represented in FIG. 5 may include some or all of the features of operation 400, for example. Detail view 500 illustrates formation of a posterior layer 504 (e.g., layer 310) on a mold 502, and detail view 510 illustrates formation of an anterior layer 514 (e.g., layer 305) on a mold 512.

One or each of layers 504, 510 may be comprised of one of a silicone, silicone hydrogel, hydrogel, rigid gas permeable (RGP) material, rigid plastic (e.g., polycarbonate), polymethyl methacrylate (PMMA), polymerized acrylate. Although certain embodiments are not limited in this regard, layers 504, 510 may be flexible, in some embodiments. In one illustrative embodiment, one or each of layers 504, 510 have a diameter between 11 and 14 mm in size. Alternatively or in addition, one or each of layers 504, 510 is between 20 microns and 150 microns (e.g., between 20 microns and 100 microns) thick. However, such dimensions may vary in different embodiments according to implementation specific details.

Formation of layers 504, 514 may include some or all of the features of the forming at 405, 410, for example. In an embodiment, a recess (not shown)—e.g., 0.1 to 50 um deep—is shaped in a concave side 534 of anterior layer 514, or in a recess in a convex side 524 of posterior layer 504, to aid in the formation of a LC layer of an accommodation actuator element. The shaping of such a recess may include pressing and curing between two molds the enclosure material of one of layers 504, 514.

Detail view 520 illustrates a flexible electrode 522 (e.g., electrode 320) deposited on convex surface 524 of posterior layer 504, and detail view 530 illustrates a flexible electrode 532 (e.g., electrode 315) deposited on concave surface 534 of posterior layer 514. Formation of one or each of electrodes 522, 532 may including spraying, stamping, shadow masking, evaporating or otherwise depositing a conductive epoxy (e.g., a conductive silicone), a metal (e.g., gold, aluminum, silver, etc.) or other conductive material. The resulting electrodes 522, 532 may include metal wires, nanowires, indium tin oxide thin films or other such conductive structures to operate an accommodation actuator. In an embodiment, one or each of flexible electrodes 522, 532 has a thickness between 10 nm and 10 microns and a diameter between 2 mm and 3 mm. However, such thicknesses may vary according to implementation specific details. In some embodiments, a flexible electrode has a main body portion and a tab portion (not shown), extending from the main body portion, where the main body portion is to be aligned with a LC layer of an accommodation actuator, and the tab portion is to extend through a pinch-off region that separates the LC layer from a substrate having integrated circuitry disposed therein and/or thereon.

Detail view 540 illustrates placement of such a substrate (e.g., ring substrate 330)—e.g., including the illustrative control circuitry 542 and antenna 544—on posterior layer 504. In another embodiment, the substrate may instead be initially placed on surface 534. Detail view 550 shows deposition of a LC layer 554 on a concave side of anterior layer 514. Deposition of the LC layer 554 may be including operations adapted from conventional shadow mask, stamping or other fabrication techniques. In an embodiment, an accommodation actuator structure (e.g., a LC layer) comprises, or adjoins, isolation layers providing at least some isolation that prevents or limits one or more conductive paths between a pinch-off region and electrode structures. For example, at least partially dielectric alignment layers (not shown) of the accommodation actuator may be disposed on opposite sides of LC layer 554. The LC layer 554 may have a thickness of between 0.1 um and 50 um and/or a diameter of between 4 mm and 10 mm. However, such dimensions are merely illustrative and not limiting on certain embodiments.

Detail view 560 shows respective structures represented in detail views 540, 550 having been aligned and brought into contact with each other. In some embodiments, one or both of surfaces 524, 534 may be pretreated—e.g., with a plasma—to improve adhesion between the two. Layers 504, 514 may then be sealed to form a flexible enclosure, where an accommodation actuator 562 is located within a central region of the flexible enclosure. A perimeter of the central region may be defined at least in part by a pinch-off region 564 where layers 504, 514 are adjacent to (e.g., physically contact) one another.

For example, an additional amount of contact lens material—e.g., a silicone elastomer, a silicone hydrogel or the like—may be disposed around LC layer 554 to aid in adhering layers 504, 514. Curing of such additional material (e.g., by heat or ultraviolet light) may result in a sealing of the accommodation actuator within the central region around which pinch-off region 564 is disposed. In some embodiments, contact lens material may also be applied at an edge region around one of layers 504, 514, where this additional material is also cured to seal the ring substrate in a region of the lens enclosure between pinch-off region 564 and the respective edges of layers 504, 514.

The electrodes 522, 532 may be separated from one another in pinch-off region 564. For example, in one illustrative embodiment, conductive layers 522, 532 have a 6 mm diameter, and the pinch-off region has a 7 mm diameter, where the LC layer 554 provides for separation of the conductive layers 522, 532 in the central region around which pinch-off region 564 is formed.

Figure 6:
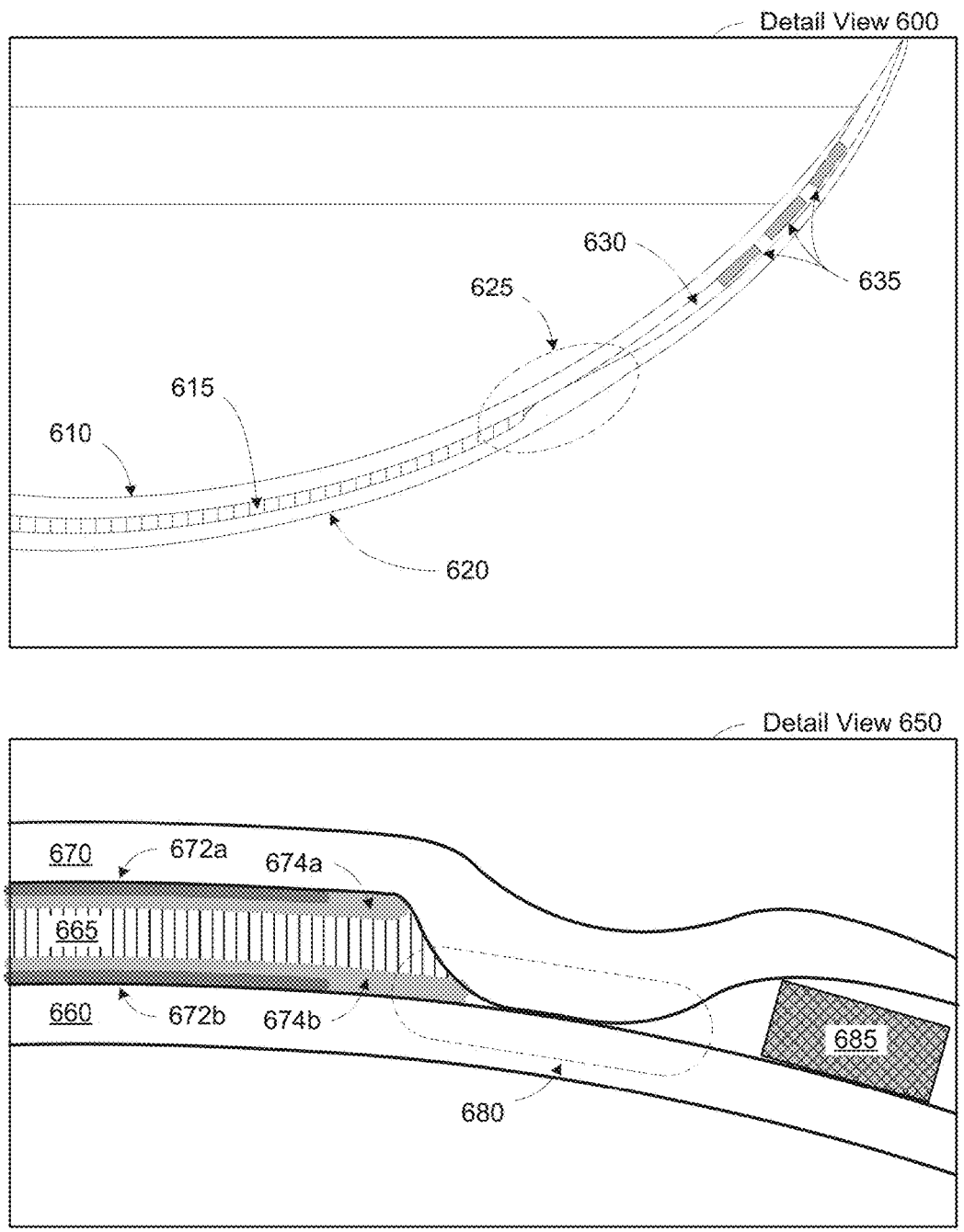
FIG. 6 shows cross-sectional views of respective eye-mountable devices each according to a corresponding embodiment.

FIG. 6 show cross-sectional detail views 600, 650 of eye-mountable devices each according to a respective embodiment. For example, detail view 600 shows a posterior encapsulation layer 610 sealed with an anterior encapsulation layer 620 to form a flexible lens enclosure. A central region of the flexible lens enclosure is defined at least in part by a pinch-off region 625 that extends around a perimeter of the central region. The pinch-off region 625 may serve as a seal to hold an accommodation actuator 615 within the central region. In some embodiments, a peripheral region 630 is located around a periphery of pinch-off region 625— e.g., where peripheral region 630 extends from pinch-off region 625 to the respective circumferential edges of encapsulation layers 610, 620. Peripheral region 630 may include a contact lens material that is disposed and cured to aid in sealing of encapsulation layers 610, 620 with one another. A substrate 635, having integrated circuitry disposed thereon, may be disposed between encapsulation layers 610, 620 within peripheral region 630

In detail view 600, a recess is formed in a concave surface of anterior encapsulation layer 620 to aid in the positioning of accommodation actuator 615 during fabrication processing (e.g., according to method 400). In another embodiment, an encapsulation layer may additionally or alternatively be deformed to aid in the formation of a pinch-off region. By way of illustration and not limitation, detail view 650 shows a posterior encapsulation layer 660 sealed with an anterior encapsulation layer 670 to form a flexible lens enclosure, wherein an accommodation actuator is disposed between encapsulation layers 660, 670 within a central region of the eye-mountable device. Respective portions of the encapsulation layers 660, 670 may adjoin one another to form a pinch-off region 680 that defines at least in part a perimeter of the central region. A pinch-off region such as region 680 may be formed at least in part by a layer of a lens material, the thickness of which extends from a flexible conductor to an exterior surface of the EMD. For example, a pinch-off region may be formed by anterior and posterior layers of lens material that each extend from a respective flexible conductor to a different respective exterior side of the EMD. The exterior surface of one such layer of lens material may be deformed in an area over the pinch-off region. As illustrated in detail view 650, a pinch-off region 680 may be formed at least in part by a flat or convex portion of an otherwise concave surface (e.g., the posterior surface) of an anterior encapsulation layer such as layer 670.

The pinch-off region 680 may separate a LC layer 665 from circuitry 685 (e.g., of ring substrate 330) that is disposed between encapsulation layers 660, 670 in a peripheral region of the flexible lens enclosure. As shown in detail view 650, the central region formed by encapsulation layers 660, 670 may taper in a direction extending toward pinch-off region 680. Alternatively or in addition, the peripheral region including integrated circuitry 685 may taper in a direction extending toward pinch-off region 680.

The accommodation actuator may comprise, or adjoin, isolation layers disposed between respective portions of an accommodation actuator structure (e.g., a liquid crystal layer) and a flexible conductor. For example, the accommodation actuator may include alignment layers 674a, 674b and LC layer 665. One or each of alignment layers 674a, 674b may have a thickness of 10 nm to 10 microns, although certain embodiments are not limited in this regard. Flexible, transparent electrodes 672a, 672b (e.g., electrodes 315, 320) may be disposed on opposite sides of the accommodation actuator—e.g., where alignment layers 674a, 674b provide at least some isolation to prevent one or more conductive paths between pinch-off region 680 and transparent electrodes 672a, 672b. Under control of circuitry 685, electrodes 672a, 672b may apply a voltage differential across the accommodation actuator. Alignment layers 672a, 672b may comprise polyimide or other suitable material to provide for changing an alignment of liquid crystal molecules to change a refractive index of LC layer 665. In one embodiment, an unpowered state of the LC layer 665 allows for distance viewing—e.g., where any non-zero voltage applied across the liquid crystal layer shortens a focal distance of the eye-mountable device (as compared to a focal distance of the eye-mountable device without any such voltage applied).

Figure 7A:
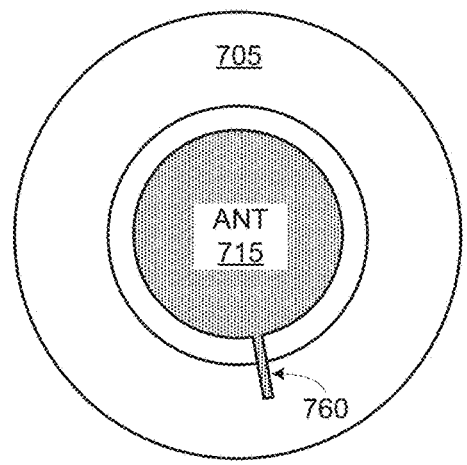
FIGS. 7A-7C illustrate configurations of conductive electrodes relative to a liquid crystal layer within the eye-mountable device, in accordance with an embodiment.
Figure 7B:
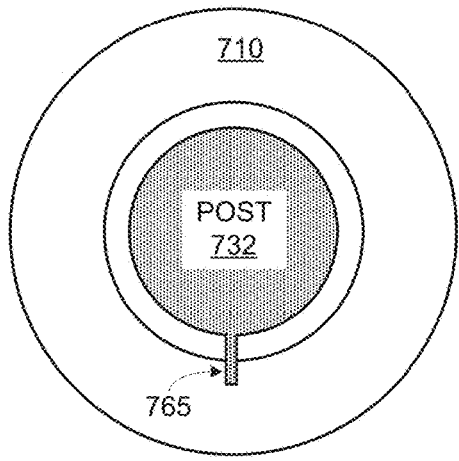
Figure 7C:
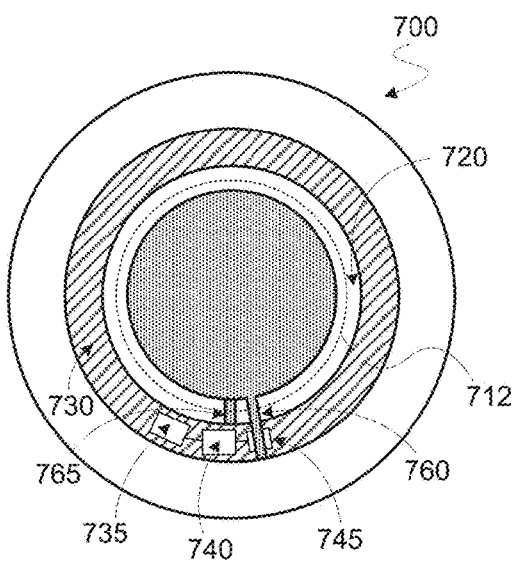
Figure 8:
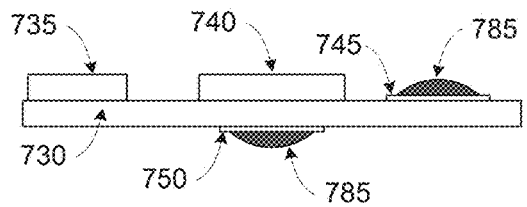
FIG. 8 is a profile view that illustrates connections between a ring substrate and conductive electrodes within an eye-mountable device, in accordance with an embodiment.

FIGS. 7A-7C illustrate example orientations of an anterior flexible conductive electrode (ANT) 705 and a posterior flexible conductive electrode (POST) 732 within an eye-mountable device 700, in accordance with an embodiment. FIG. 7A illustrates ANT 705 formed onto the concave surface of an anterior layer 705, FIG. 7B illustrates POST 732 formed onto the convex surface of a posterior layer 710, and FIG. 7C is a plan view illustration of a fully assembled eye-mountable device 700. FIG. 8 is a profile illustration of a portion of ring substrate 730 that forms electrical connections to a connection tab 760 of ANT 715 and a connection tab 765 of POST 732, in accordance with an embodiment.

In the illustrated embodiment, ANT 715 includes connection tab 760 for electrically connecting to anterior contact pad 745 disposed on the front side of ring substrate 730. Correspondingly, POST 732 includes connection tab 765 for electrically connecting to posterior contact pad 750 disposed on the backside of ring substrate 730. FIG. 8 illustrates the use of conductive adhesive 785 to improve the electrically connections between connection tabs 760 and 765 and contact pads 745 and 750, respectively. Conductive adhesive 785 may be implemented using a variety of different materials, such as, silver loaded epoxies, silicon, or polyurethane, or otherwise. Conductive adhesive 785 provides flexible, conductive adhesion that maintains electrical connection when the smart contact lens is bent or folded despite the different flexibility characteristics of the various constituent parts of eye-mountable device 700.

In the illustrated embodiment, connection tabs 760 and 765 are rotationally offset relative to each other to make room for a through-substrate via for one or both of contact pads 745, 765. For example, in the illustrated embodiment, power supply 735 and controller circuit 740 are disposed on the front side of ring substrate 730, thus posterior contact pad 750 is connected to controller circuit 740 using a through substrate via.

FIG. 7C further illustrates the contour 712 of a LC layer between ANT 715 and POST 732. The LC layer may separate ANT 715 and POST 732 from one another, and may be actuated by voltages applied across these electrodes by controller circuit 740. In the illustrated embodiment, the LC layer extends across a larger portion of the center region to ensure that ANT 715 and POST 732 do not short circuit to each other. In one embodiment, transparent insulating layers (e.g., polyimide) may be further applied each to separate the LC layer from a respective one of ANT 715 and POST 732, while in other embodiments ANT 715 and POST 732 may form direct contact with the LC layer. Both LC layer 720 and respective portions of ANT 715 and POST 732—e.g., other than connection tabs 760, 765—may be contained within the inner radius of ring substrate 730 and may not contact the inner edge of ring substrate 730. In one embodiment, ANT 715 and POST 732 have a diameter of approximately 6 mm, LC layer 725 has a diameter of approximately 7 mm, and the inner edge of ring substrate 730, which defines the center region, has a diameter of 9 mm. Of course, other dimensions may be implemented. Anterior layer 705 and posterior layer 710 may come in contact with one another to form a pinch-off region 720 between diameter of contour 712 and a larger diameter of the inner edge of ring substrate 730. Pinch-off region 720 may variously prevent shorting of the liquid crystal layer, ANT 715 and/or POST 732 to at least some circuitry of ring substrate 730.

Techniques and architectures for providing automatic accommodation with an eye-mountable device are described herein. Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. An eye-mountable device (EMD) comprising:
    a lens enclosure including a central region, a peripheral region, a first encapsulation layer and a second encapsulation layer, wherein the second encapsulation layer is sealed to the first encapsulation layer, and configured to be removeably mounted over an eye surface;
    a liquid crystal material disposed across the central region of the lens enclosure;
    a first electrode disposed within the lens enclosure between the first encapsulation layer and the liquid crystal material;
    a second electrode disposed within the lens enclosure between the second encapsulation layer and the liquid crystal material;
    a substrate disposed within the lens enclosure between the first and second encapsulation layers;
    a controller disposed on the substrate and electrically coupled to the first and second electrodes to apply a voltage across the liquid crystal material; and
    a pinch-off region defining a perimeter of the central region where a portion of the first encapsulation layer physically contacts a portion of the second encapsulation layer, wherein the pinch-off region separates the central region from the peripheral region.

2. The EMD of claim 1, wherein the substrate is disposed in a peripheral region that extends around at least a portion of the liquid crystal material in the central region.

3. The EMD of claim 2,
    wherein the pinch-off region at least partially seals the liquid crystal material in the central region.

4. The EMD of claim 3, wherein the pinch-off region comprises a recess disposed in one of the first or second encapsulation layers that forms physical contact between the first and second encapsulation layers to seal the liquid crystal material in the central region.

5. The EMD of claim 4, wherein at least one of the first or second encapsulation layer adjacent to the recess forms a taper of the central region that extends in a direction toward the pinch-off region.

6. The EMD of claim 4, wherein at least one of the first or second encapsulation layer adjacent to the recess forms a taper of the peripheral region that extends in a direction toward the pinch-off region.

7. The EMD of claim 3, wherein the pinch-off region separates the liquid crystal material in the central region from the substrate in the peripheral region.

8. The EMD of claim 7, wherein respective edges of the first and second encapsulation layers are sealed together around a perimeter edge of the peripheral region to seal the substrate.

9. The EMD of claim 3, wherein the first electrode includes a first main body portion and a first connection tab that extends from the first main body portion and through the pinch-off region, wherein the second electrode includes a second main body portion and a second connection tab that extends from the second main body portion and through the pinch-off region, wherein the controller is coupled to the first and second connection tabs.

10. The EMD of claim 9, wherein the first connection tab and the second connection tab are rotationally offset from each other.

11. The EMD of claim 9, further comprising:
    a first contact disposed on a first side of the substrate and coupled to the controller; and
    a second contact disposed on a second side of the substrate, opposite the first side, and coupled to the controller,
    wherein the substrate is disposed between the first and second connection tabs and wherein the first connection tab overlaps and is coupled to the first contact and the second connection tab overlaps and is coupled to the second contact.

12. The EMD of claim 2, further comprising:
    a sensor system disposed within the lens enclosure and coupled to the controller,
    wherein the controller includes logic that when executed by the controller causes the controller to perform operations including:
        monitoring feedback signals from the sensor system;
        determining a gaze direction or a focal distance based upon the feedback signals; and
        adjusting the voltage applied across the liquid crystal material to automatically adjust a level of accommodation provided by the EMD.

13. The EMD of claim 12, wherein the sensor system comprises a capacitive sensor system that monitors eyelid overlap.

14. The EMD of claim 13, wherein the capacitive sensor system comprises a ring of capacitive sensors extending at least partially around the peripheral region.

15. The EMD of claim 1, further comprising:
    a first alignment layer disposed between the liquid crystal material and the first electrode, wherein the first alignment layer extends across the central region and has a larger area than that of the first electrode; and
    a second alignment layer disposed between the liquid crystal material and the second electrode, wherein the second alignment layer extends across the central region and has a larger area than that of the second electrode,
    wherein the first and second alignment layers align molecules of the liquid crystal material.

16. The EMD of claim 1, wherein the first and second encapsulation layers comprise a flexible contact lens material.

17. An eye-mountable device (EMD) comprising:
    a lens enclosure including a first encapsulation layer and a second encapsulation layer, wherein the lens enclosure is curved for mounting over an eye surface;
    a liquid crystal material disposed across a central region of the lens enclosure;
    a first electrode disposed within the lens enclosure between the first encapsulation layer and the liquid crystal material;
    a second electrode disposed within the lens enclosure between the second encapsulation layer and the liquid crystal material;
    a substrate disposed within the lens enclosure between the first and second encapsulation layers, wherein the substrate is disposed in a peripheral region that extends around at least a portion of the liquid crystal material in the central region;
    a controller disposed on the substrate and electrically coupled to the first and second electrodes to apply a voltage across the liquid crystal material; and
    a pinch-off region defining a perimeter of the central region where a portion of the first encapsulation layer physically contacts a portion of the second encapsulation layer, wherein the pinch-off region separates the liquid crystal material in the central region from the substrate in the peripheral region.

18. An eye-mountable device (EMD) comprising:
- a lens enclosure including a first encapsulation layer and a second encapsulation layer sealed to the first encapsulation layer, wherein the second encapsulation layer is configured to be removeably mounted over an eye surface;
- a liquid crystal material disposed across a central region of the lens enclosure;
- a first electrode disposed within the lens enclosure between the first encapsulation layer and the liquid crystal material;
- a second electrode disposed within the lens enclosure between the second encapsulation layer and the liquid crystal material;
- a substrate disposed within the lens enclosure between the first and second encapsulation layers, wherein the substrate is disposed in a peripheral region that extends around at least a portion of the liquid crystal material in the central region;
- a controller disposed on the substrate and electrically coupled to the first and second electrodes to apply a voltage across the liquid crystal material; and
- a pinch-off region defining a perimeter of the central region where a portion of the first encapsulation layer physically contacts a portion of the second encapsulation layer, wherein the pinch-off region seals the liquid crystal material in the central region.

19. The EMD of claim 18, wherein the pinch-off region separates the liquid crystal material in the central region from the substrate in the peripheral region.

* * * * *